United States Patent
Lin et al.

(10) Patent No.: US 12,113,249 B2
(45) Date of Patent: Oct. 8, 2024

(54) BATTERY CELL, BATTERY, AND ELECTRICAL DEVICE

(71) Applicant: CONTEMPORARY AMPEREX TECHNOLOGY CO., LIMITED, Ningde (CN)

(72) Inventors: Denghua Lin, Ningde (CN); Jie Sun, Ningde (CN); Zhijun Guo, Ningde (CN); Yongbin Wu, Ningde (CN); Peng Wang, Ningde (CN); Haizu Jin, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/353,605

(22) Filed: Jul. 17, 2023

(65) Prior Publication Data
US 2023/0361438 A1    Nov. 9, 2023

Related U.S. Application Data

(63) Continuation of application No. PCT/CN2022/096364, filed on May 31, 2022.

(30) Foreign Application Priority Data

Jul. 30, 2021 (CN) .......................... 202121772418.6

(51) Int. Cl.
    *H01M 50/593*    (2021.01)
(52) U.S. Cl.
    CPC ...... *H01M 50/593* (2021.01); *H01M 2220/20* (2013.01)

(58) Field of Classification Search
None
See application file for complete search history.

(56) References Cited

U.S. PATENT DOCUMENTS

2011/0104559 A1*  5/2011  Kim ................... H01M 50/567
                                                    429/163

FOREIGN PATENT DOCUMENTS

| CN | 107710459 A | 2/2018 |
| CN | 215266598 U | 12/2021 |

(Continued)

OTHER PUBLICATIONS

The World Intellectual Property Organization (WIPO) International Search Report for PCT/CN2022/096364 Jul. 15, 2022 5 pages (including English translation).

*Primary Examiner* — Haixia Zhang
(74) *Attorney, Agent, or Firm* — ANOVA LAW GROUP, PLLC

(57) ABSTRACT

A battery cell includes a housing having an opening, a cover plate configured to close the opening, and an electrode assembly disposed in the housing and including a main body and a tab extending from an end of the main body along a first direction. The cover plate is located on a side of the main body along a second direction perpendicular to the first direction. The battery cell further includes a first insulation piece disposed between the electrode assembly and the cover plate to dielectrically insulate the electrode assembly from the cover plate, and a second insulation piece disposed between the main body and an inner surface of the housing to dielectrically insulate the tab from the housing. The second insulation piece and the first insulation piece are discretely disposed and connected to each other.

9 Claims, 7 Drawing Sheets

(56) References Cited

FOREIGN PATENT DOCUMENTS

| JP | 2019061779 A | 4/2019 |
| JP | 2019121496 A | 7/2019 |
| JP | 2021022453 A | 2/2021 |

* cited by examiner

BATTERY CELL, BATTERY, AND ELECTRICAL DEVICE

CROSS-REFERENCE TO RELATED APPLICATIONS

This application is a continuation of International Application No. PCT/CN2022/096364, filed on May 31, 2022, which claims priority to Chinese Patent Application No. 202121772418.6, filed on Jul. 30, 2021 and entitled "BATTERY CELL, BATTERY, AND ELECTRICAL DEVICE", which are incorporated herein by reference in their entirety.

TECHNICAL FIELD

This application relates to the technical field of battery manufacturing, and in particular, to a battery cell, a battery, and an electrical device.

BACKGROUND

With the continuous booming of the new energy vehicle market, the power battery industry is growing and expanding rapidly. With the lithium battery technology becoming more sophisticated, higher requirements have been put forward on safety performance, energy density, and ease of industrialization of battery cells.

In order to improve safety performance of a battery cell, an electrode assembly of the battery cell needs to be dielectrically protected by an insulation assembly, so as to avoid a short circuit of the battery cell caused by contact between the electrode assembly and a housing of the battery cell. Currently, the dielectric protection of the electrode assembly is primarily implemented by an insulation tape folding process. This process is not only time-consuming, but also increases an outline dimension of the battery cell and reduces the energy density.

SUMMARY

For this purpose, this application discloses a battery cell, a battery, and an electrical device that can dielectrically insulate an electrode assembly from a housing and that are convenient to assemble. Because the insulation method increases an outline dimension of the battery cell to just a small extent, an energy density of the battery cell is relatively high.

A first aspect of this application discloses a battery cell, including: a housing, on which an opening is made; a cover plate, configured to close the opening; an electrode assembly, disposed in the housing, where the electrode assembly includes a main body and a tab extending from an end of the main body along a first direction, the cover plate is located on a side of the main body along a second direction, and the first direction is perpendicular to the second direction; a first insulation piece, disposed between the electrode assembly and the cover plate to dielectrically insulate the electrode assembly from the cover plate; and a second insulation piece, disposed between the main body and an inner surface of the housing to dielectrically insulate the tab from the housing. The second insulation piece and the first insulation piece are discretely disposed and connected to each other.

The electrode assembly is dielectrically insulated from the cover plate by the first insulation piece, the tab is dielectrically insulated from the housing by the second insulation piece, and the first insulation piece and the second insulation piece are discretely disposed and connected to each other. This facilitates assembling, and reduces the thickness of an insulation assembly formed by assembling the first insulation piece and the second insulation piece, and therefore, reduces the extent to which the outline dimension of the battery cell is increased after the insulation assembly is fitted to the electrode assembly, thereby enabling the battery cell to achieve a relatively high energy density.

According to some embodiments of this application, the second insulation piece includes a side plate and a first end plate. The side plate is located between the tab and the inner surface of the housing along the first direction. The side plate extends along a direction perpendicular to the first direction. The first end plate is connected to an end that is of the side plate and that is oriented toward the cover plate. The first end plate is connected to the first insulation piece.

The tab is dielectrically insulated from the inner surface of the housing in the first direction by the side plate, the tab is dielectrically insulated from the cover plate in the second direction by the first end plate, and the first end plate is connected to the first insulation piece, thereby avoiding increase of the thickness of the insulation assembly caused in a direction perpendicular to the first direction and the second direction, and reducing the extent of increase of the outline dimension of the battery cell caused by the insulation assembly, and in turn, enabling the battery cell to achieve a relatively high energy density.

According to some embodiments of this application, the first insulation piece includes a first part and a second part. An outer surface of the first part abuts against the cover plate. The second part is formed by extending the first part away from the main body along the first direction. An accommodation space is formed between the second part and the cover plate. The first end plate extends into the accommodation space and abuts against the second part.

The first end plate extends into the accommodation space and abuts against the second part, thereby not only implementing the connection between the first insulation piece and the second insulation piece, but also filling a clearance between the first end plate and the tab, and in turn, preventing the second insulation piece from wobbling against the tab along the second direction to get detached from the tab.

According to some embodiments of this application, along a direction consistent with the first direction and oriented away from the main body, a distance between the second part and the cover plate increases gradually.

Because the distance between the second part and the cover plate increases gradually along the direction away from the main body, a guide structure can be formed to facilitate the first end plate to extend into the accommodation space along the first direction, facilitate assembling of the second insulation piece together with the first insulation piece and the electrode assembly, and improve the assembling efficiency.

According to some embodiments of this application, a surface that is of the first end plate and that is oriented away from the cover plate is snap-fit connected to a surface that is of the second part and that is close to the cover plate, so as to restrict the first end plate from shifting against the first insulation piece along the first direction.

The snap-fit connection between the first end plate and the second part of the first insulation piece can restrict the first end plate from shifting against the first insulation piece along the first direction, so that the second insulation piece is firmly connected to the first insulation piece.

According to some embodiments of this application, a bulge is disposed on one of, and a groove is disposed on the other of, the surface that is of the second part and that is close to the cover plate or the surface that is of the first end plate and that is oriented away from the cover plate. The bulge fits with the groove to restrict the first end plate from shifting against the first insulation piece along the first direction.

The fit between the bulge and the groove restricts the first end plate from shifting against the first insulation piece along the first direction, so that the structure is simple and easy to process, and the snap-fit connection is firm and reliable.

According to some embodiments of this application, the second insulation piece further includes a second end plate. The second end plate is connected to another end of the side plate along the second direction. The second end plate is disposed between the tab and the inner surface of the housing along the second direction to dielectrically insulate the tab from the housing.

The second end plate disposed between the tab and the inner surface of the housing can dielectrically insulate the tab from the housing on the side that is of the electrode assembly and that is oriented away from the cover plate, so as to achieve the effect of dielectric protection.

According to some embodiments of this application, an end that is of the tab and that is oriented away from the cover plate along the second direction includes a curved face. The second end plate is an arc-shaped plate that matches the curved face.

The matching between the second end plate and the surface of the tab can not only reduce the outline dimension of the second insulation piece, but also reduce a clearance between the second insulation piece and the tab, and enable a firm fit between the second insulation piece and the tab.

According to some embodiments of this application, the second insulation piece further includes a third end plate and a fourth end plate. The third end plate and the fourth end plate are connected to two sides of the side plate along a third direction respectively. The third direction is perpendicular to the first direction and the second direction. The side plate, the first end plate, the second end plate, the third end plate, and the fourth end plate close in to form a cavity opened toward the electrode assembly. At least a part of the tab is accommodated in the cavity.

With at least a part of the tab being accommodated in the cavity, the tab can be dielectrically insulated from the inner surface of the housing, and the tab can be prevented from contacting the inner surface of the housing to cause an internal short circuit of the battery cell.

According to some embodiments of this application, the battery cell further includes a third insulation piece. The third insulation piece is disposed between the main body and the inner surface of the housing to dielectrically insulate the main body from the housing. An end of the third insulation piece along the first direction is connected to the second insulation piece. On a plane perpendicular to the third direction, a projection of a connection region between the third insulation piece and the second insulation piece falls into a projection of the tab.

The third insulation piece can dielectrically insulate the main body from the inner surface of housing. By being connected to the second insulation piece, the third insulation piece can dielectrically insulate a junction between the main body and the tab. By leaving the projection of the connection region between the third insulation piece and the second insulation piece to fall into the projection of the tab, this application avoids additionally increasing the outline dimension of the battery cell, and achieves a relatively high energy density of the battery cell.

A second aspect of this application further discloses a battery, including the battery cell according to an embodiment of the first aspect of this application.

A third aspect of this application discloses an electrical device, including the battery according to an embodiment of the second aspect of this application.

Additional aspects and advantages of this application will be partly given in the following description, and a part thereof will become evident in the following description or will be learned in the practice of this application.

BRIEF DESCRIPTION OF DRAWINGS

To describe technical solutions in embodiments of this application more clearly, the following outlines the drawings to be used in the embodiments. Understandably, the following drawings show merely some embodiments of this application, and therefore, are not intended to limit the scope. A person of ordinary skill in the art may derive other related drawings from the drawings without making any creative efforts.

Figure 1:
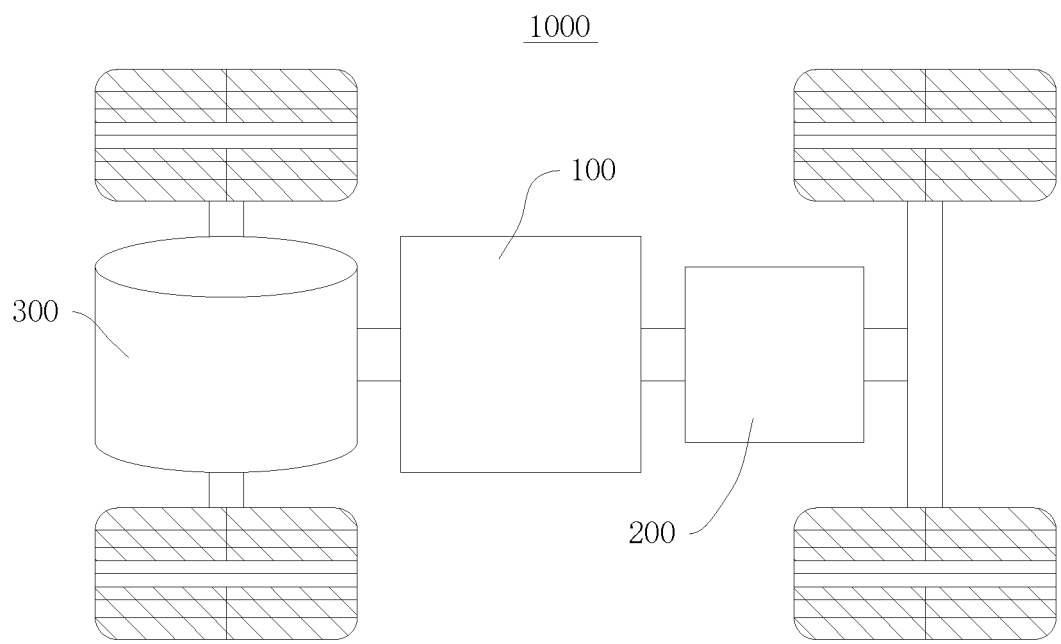
FIG. 1 is a brief schematic diagram of a vehicle according to an embodiment of this application.

REFERENCE NUMERALS 1000. vehicle; 100. battery; 10. battery cell; 11. housing; 12. end cap assembly; 121. cover plate; 122. electrode terminal; 123. pressure relief portion; 13. electrode assembly; 131. main body; 132. tab; 1321. curved face; 14. insulation assembly; 141. first insulation piece; 1411. first part; 14111. insulation bulge; 1412. second part; 14121. first surface; 14122. second surface; 14123. groove; 14124. accommodation space; 142. second insulation piece; 1421. side plate; 14211. first end; 14212. second end; 1422. first end plate; 14221. third surface; 14222. fourth surface; 14223. bulge; 1423. second end plate; 1424. third end plate; 1425. fourth end plate; 1426. cavity; 1427. first contour line; 1428. second contour line; 143. third insulation piece; 1431.

connection edge; 1432. connection region; 15. current collecting member; 20. box; 21. first box part; 22. second box part; 200. controller; 300. motor.

DETAILED DESCRIPTION OF EMBODIMENTS

To make the objectives, technical solutions, and advantages of the embodiments of this application clearer, the following gives a clear description of the technical solutions in some embodiments of this application with reference to the drawings in some embodiments of this application. Evidently, the described embodiments are merely a part rather than all of the embodiments of this application. All other embodiments derived by a person of ordinary skill in the art based on the embodiments of this application without making any creative efforts still fall within the protection scope of this application.

Unless otherwise defined, all technical and scientific terms used herein have the same meanings as what is normally understood by a person skilled in the technical field of this application. The terms used in the specification of this application are merely intended to describe specific embodiments but not intended to limit this application. The terms "include" and "contain" and any variations thereof used in the specification, claims, and brief description of drawings of this application are intended as non-exclusive inclusion. The terms such as "first" and "second" used in the specification, claims, and brief description of drawings herein are intended to distinguish between different items, but are not intended to describe a specific sequence or order of precedence.

Reference to "embodiment" in this application means that a specific feature, structure or characteristic described with reference to the embodiment may be included in at least one embodiment of this application. Reference to this term in different places in the specification does not necessarily represent the same embodiment, nor does it represent an independent or alternative embodiment in a mutually exclusive relationship with other embodiments. A person skilled in the art explicitly and implicitly understands that the embodiments described in this application may be combined with other embodiments.

In the description of this application, unless otherwise expressly specified and defined, the terms "mount", "concatenate", "connect", and "attach" are understood in a broad sense. For example, a "connection" may be a fixed connection, a detachable connection, or an integrated connection; or may be a direct connection or an indirect connection implemented through an intermediary; or may be internal communication between two components. A person of ordinary skill in the art is able to understand the specific meanings of the terms in this application according to specific situations.

"A plurality of" referred to in this application means two or more (including two).

In this application, a battery cell may include a lithium-ion secondary battery, a lithium-ion primary battery, a lithium-sulfur battery, a sodium-lithium-ion battery, a sodium-ion battery, a magnesium-ion battery, or the like, without being limited in embodiments of this application. The battery cell may be in various shapes such as a cylinder, flat body, or cuboid, without being limited in embodiments of this application. Depending on the form of packaging, battery cells are generally classed into three types: cylindrical battery cell, prismatic battery cell, and pouch-type battery cell.

The battery mentioned in embodiments of this application means a unitary physical module that includes one or more battery cells to provide a higher voltage and a higher capacity. For example, the battery mentioned in this application may include a battery module, a battery pack, or the like. A battery typically includes a box configured to package one or more battery cells. The box prevents liquid or other foreign matters from affecting the charging or discharging of the battery cells.

A battery cell includes an electrode assembly and an electrolytic solution. The electrode assembly includes a positive electrode plate, a negative electrode plate, and a separator. The battery cell works primarily by shuttling metal ions between the positive electrode plate and the negative electrode plate. The positive electrode plate includes a positive current collector and a positive active material layer. A surface of the positive current collector is coated with the positive active material layer. Of the positive current collector, a part uncoated with the positive active material layer protrudes from a part coated with the positive active material layer. The part, uncoated with the positive active material layer, of the positive current collector, serves as a positive tab. Using a lithium-ion battery as an example, the positive current collector may be made of aluminum, and a positive active material may be lithium cobalt oxide, lithium iron phosphate, ternary lithium, lithium manganese oxide, or the like. The negative electrode plate includes a negative current collector and a negative active material layer. A surface of the negative current collector is coated with the negative active material layer. Of the negative current collector, a part uncoated with the negative active material layer protrudes from a part coated with the negative active material layer, and the part uncoated with the negative active material layer serves as a negative tab. The negative current collector may be made of copper, and a negative active material may be carbon, silicon, or the like. In order to ensure passage of a large current without fusing off, the positive tab is plural in number, and the plurality of positive tabs are stacked together; the negative tab is plural in number, and the plurality of negative tabs are stacked together. The separator may be made of a material such as PP (polypropylene, polypropylene) or PE (polyethylene, polyethylene). In addition, the electrode assembly may be a jelly-roll structure or a stacked structure, without being limited herein.

The battery cell further includes a pressure relief portion. The pressure relief portion is actuated when an internal pressure of the battery cell reaches a threshold. The threshold may vary depending on design requirements. The threshold may depend on the material of one or more of the positive electrode plate, the negative electrode plate, the electrolytic solution, or the separator in the battery cell. The pressure relief portion may be in the form of an explosion-proof valve, a gas valve, a pressure relief valve, a safety valve, or the like, and specifically may be a pressure-sensitive or temperature-sensitive element or structure. To be specific, when the internal pressure or temperature of the battery cell reaches the threshold, the pressure relief portion is actuated or a fragile structure disposed in the pressure relief portion is ruptured to form an opening or channel for relieving the internal pressure or temperature.

The term "actuate" mentioned in this application means that the pressure relief portion performs an action or is activated to a given state so that the internal pressure and temperature of the battery cell is relieved. The actions performed by the pressure relief portion may include, but are not limited to, rupturing, shattering, tearing, or bursting at least a part of the pressure relief portion, or the like. When the pressure relief portion is actuated, high-temperature and high-pressure substances inside the battery cell are expelled as emissions out of the actuated position. In this way, the pressure and temperature of the battery cell are relieved under a circumstance of a controllable pressure or temperature to avoid potential severer accidents.

The battery cell further includes a current collecting member and a busbar component. The current collecting member is configured to electrically connect the tab of the battery cell and an electrode terminal, so that electrical energy is transferred from the electrode assembly to the electrode terminal and then transferred out of the battery cell through the electrode terminal. A plurality of battery cells are electrically connected to each other by the busbar component, so as to implement series, parallel, or series-and-parallel connection of the battery cells.

In the related art, the electrode assembly of the battery cell is dielectrically protected by an insulation assembly, and then the insulation assembly is combined with the electrode assembly to form a combination. The combination is put into the housing, and the opening of the housing is covered by a cover plate to enclose the combination in the housing. During the assembling, considering the space to be additionally occupied by the insulation assembly, the outline dimension of the housing needs to be increased to some extent to provide an enough space inside the housing for accommodating the combination, thereby being prone to reduce the energy density of the battery cell.

The applicant finds that the insulation assemblies commonly used currently are formed by an insulation tape folding process, in which a piece of integrated insulation tape is folded to wrap around the outside of the electrode assembly, so as to dielectrically insulate the electrode assembly from the housing and the cover plate. On the one hand, the method of forming the insulation assembly by the insulation tape folding process is cumbersome and requires a worker to manually fold the insulation tape, thereby being time-consuming and impairing the rhythm and efficiency of an automated assembly line. On the other hand, when the insulation tape is folded, there is inevitably a stacked connection region to ensure that the insulation tape wraps the electrode assembly. This increases a local thickness of the insulation assembly, increases the outline dimension of the assembled combination, and eventually decreases the energy density of the battery cell. If a new technical solution is disclosed to allow reduction of the maximum thickness of the insulation assembly, the energy density of the battery cell will be increased effectively.

Based on the foregoing line of reasoning, the applicant hereof discloses a technical solution that can dielectrically insulate an electrode assembly from a housing and that enables convenient assembling. Because the insulation method increases the outline dimension of the battery cell to just a small extent, the energy density of the battery cell is relatively high.

Understandably, the battery cell described in an embodiment of this application may directly supply power to an electrical device, or a plurality of battery cells may be connected in parallel or in series to form a battery that supplies power to various electrical devices.

Understandably, the electrical devices that adopt the battery cell or battery according to an embodiment of this application come in various forms, for example, a mobile phone, a portable device, a notebook computer, an electric power cart, an electric vehicle, a ship, a spacecraft, an electric toy, an electric tool. For example, the spacecraft includes an airplane, a rocket, a space shuttle, a spaceship, and the like. The electric toy includes a fixed or mobile electric toy, such as a game console, an electric car toy, an electric ship toy, an electric airplane toy, and the like. The electric tool includes an electric tool for metal cutting, an electric grinding tool, an electric assembly tool, an electric tool for railways, such as an electric drill, an electric grinder, an electric wrench, an electric screwdriver, an electric hammer, an electric impact drill, a concrete vibrator, or an electric planer.

The battery cell and the battery described in an embodiment of this application are not only applicable to the electrical devices described above, but also applicable to all electrical devices that use a battery cell or a battery. For brevity, however, the following embodiments are described by using an electric vehicle as an example.

Figure 2:
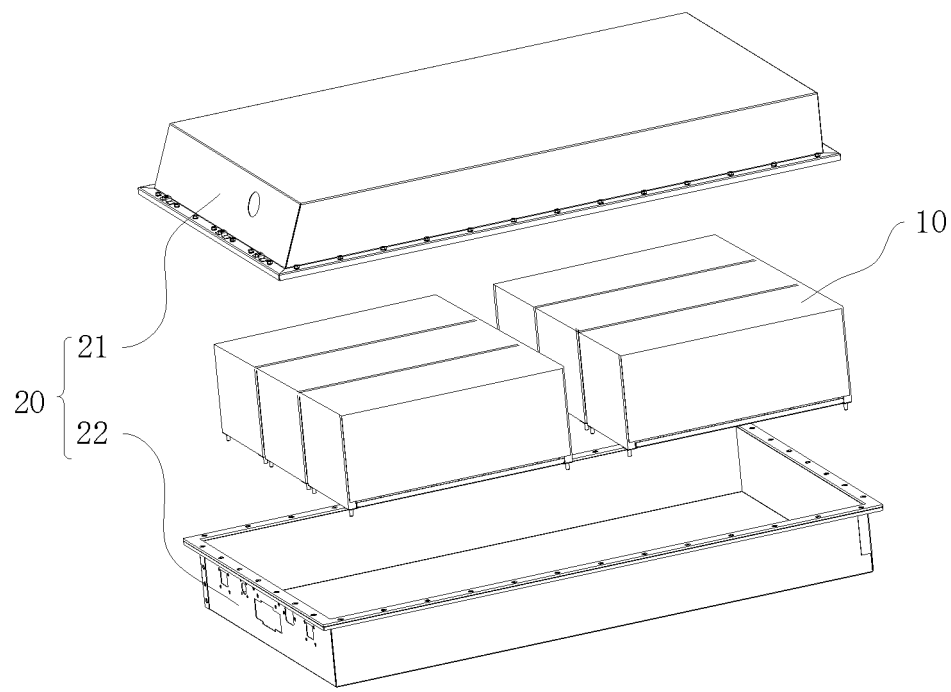
FIG. 2 is a schematic structural diagram of a battery in the vehicle shown in FIG. 1.
Figure 3:
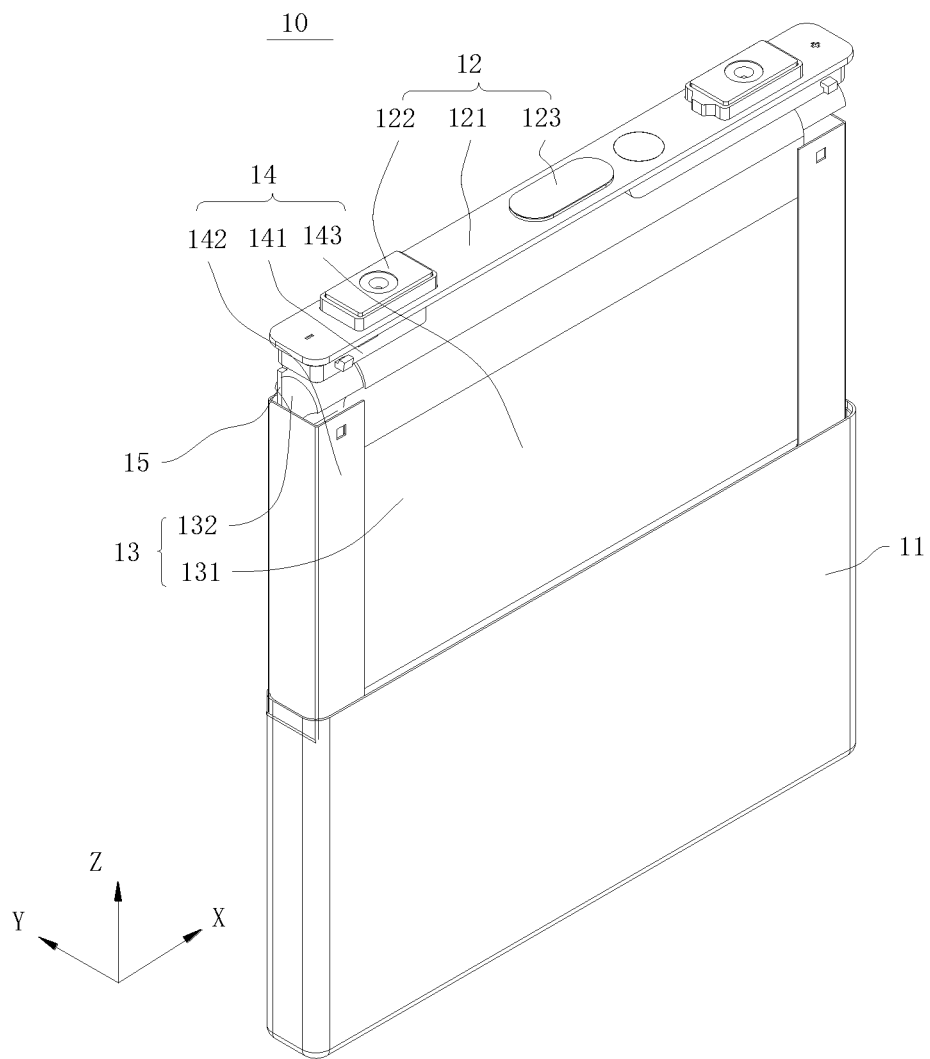
FIG. 3 is a schematic structural diagram of a battery cell in the battery shown in FIG. 2.

FIG. 1 is a brief schematic diagram of a vehicle according to an embodiment of this application; FIG. 2 is a schematic structural diagram of a battery in the vehicle shown in FIG. 1; and FIG. 3 is a schematic structural diagram of a battery cell in the battery shown in FIG. 2.

As shown in FIG. 1, a battery 100, a controller 200, and a motor 300 are disposed inside a vehicle 1000. For example, the battery 100 may be disposed at the bottom, front, or rear of the vehicle 1000. The vehicle 1000 may be an oil-fueled vehicle, a natural gas vehicle, or a new energy vehicle. The new energy vehicle may be a battery electric vehicle, a hybrid electric vehicle, a range-extended electric vehicle, or the like.

In some embodiments of this application, the battery 100 may be configured to supply power to the vehicle 1000. For example, the battery 100 may serve as an operating power supply of the vehicle 1000. The controller 200 is configured to control the battery 100 to supply power to the motor 300, for example, to meet electrical energy requirements in starting, navigating, or running the vehicle 1000.

In other embodiments, the battery 100 serves not only as an operating power supply of the vehicle 1000, but may also serve as a drive power supply of the vehicle 1000 to provide driving power for the vehicle 1000 in place of or partly in place of fuel oil or natural gas.

The battery 100 referred to herein means a unitary physical module that includes one or more battery cells to provide a higher voltage and a higher capacity. For example, the battery 100 is formed by connecting a plurality of battery cells 10 in series or in parallel.

In FIG. 2, the battery 100 includes a plurality of battery cells 10 and a box 20. The plurality of battery cells 10 are accommodated in the box 20. The box 20 includes a first box part 21 and a second box part 22. The first box part 21 and the second box part 22 fit and cover each other to form a battery cavity. The plurality of battery cells 10 are accommodated in the battery cavity. The shapes of the first box part 21 and the second box part 22 may depend on the shape of a combination of the plurality of battery cells 10. Both the first box part 21 and the second box part 22 may be opened with one opening. For example, both the first box part 21 and the second box part 22 are a hollow cuboid, and each is opened on only one surface. The opening of the first box part 21 is disposed opposite to the opening of the second box part 22. The first box part 21 and the second box part 22 are snap-fitted to each other to form a box 20 with a closed chamber. The plurality of battery cells 10 are combined by being connected in parallel, series, or series-and-parallel pattern, and then placed into the box 20 that is formed by snap-fitting the first box part 21 and the second box part 22.

As shown in FIG. 3, the battery cell 10 includes a housing 11, an end cap assembly 12, an electrode assembly 13, an insulation assembly 14, and a current collecting member 15.

The housing 11 may be hexahedral or in other shapes. An accommodation cavity is formed inside the housing 11, and is configured to accommodate the electrode assembly 13 and an electrolytic solution. The housing 11 is opened at one end so that the electrode assembly 13 can be placed into the housing 11 through the opening. The housing 11 may be made of a metal material, such as aluminum, an aluminum alloy, or nickel-clad steel.

For ease of description, the X direction is defined as a first direction, the Z direction is defined as a second direction, and the Y direction is defined as a third direction.

In some embodiments of this application, the X direction, the Y direction, and the Z direction are perpendicular to each other.

In other embodiments, the X direction, the Y direction, and the Z direction may tilt against each other.

As shown in FIG. 3, for example, the housing 11 is a hexahedron, with a length direction extending along the X direction, a height direction extending along the Z direction, and a thickness direction extending along the Y direction. One side of the housing 11 along the Z direction is opened with an opening.

The end cap assembly 12 includes a cover plate 121, two electrode terminals 122, and a pressure relief portion 123. The electrode assembly 13 is disposed inside the housing 11. The electrode assembly 13 includes a main body 131 and two tabs 132 of opposite polarities. Each tab 132 extends from an end of the main body 131 along the first direction X.

The cover plate 121 is disposed on a side of the main body along the Z direction, and is configured to close the opening of the housing 11. The cover plate 121 is configured to cover the opening of the housing 11 to enclose the electrode assembly 13 in the housing 11. The cover plate 121 is made of metal material, such as aluminum, steel, or the like. The pressure relief portion 123 is configured to be actuated when an internal pressure of the battery cell 10 reaches a threshold, so as to relieve the internal pressure and temperature of the battery cell 10.

Two electrode lead-out holes are disposed on the cover plate 121. The two electrode terminals 122 are disposed in the two electrode lead-out holes of the cover plate 121. Of the two electrode terminals 122, one is a positive electrode terminal and the other is a negative electrode terminal.

In some embodiments of this application, the cover plate 121 is in the shape of a flat plate. The size and shape of the cover plate 121 match the opening of the housing 11. The cover plate 121 is fixed to the opening of the housing 11, thereby enclosing the electrode assembly 13 and the electrolytic solution in the accommodation cavity of the housing 11.

As shown in FIG. 3, for example, of the cover plate 121, a length direction extends along the X direction, a width direction extends along the Y direction, and a thickness direction extends along the Z direction. The pressure relief portion 123 is centrally disposed on the cover plate 121 and runs through the cover plate 121 along the Z direction. The two electrode terminals 122 are disposed on two sides of the pressure relief portion 123 along the X direction respectively.

In other embodiments, depending on the shape of the battery cell 10, the cover plate 121 may be in other shapes, such as circular or oval shapes. The electrode terminals 122 and the pressure relief portion 123 may be arranged in other ways.

The main body 131 includes a positive electrode plate, a negative electrode plate, and a separator. The separator is located between the positive electrode plate and the negative electrode plate, and is configured to separate the positive electrode plate from the negative electrode plate. Of the two tabs 132, one is a positive tab, and the other is a negative tab. The positive electrode terminal 122 is electrically connected to the positive tab of the electrode assembly 13 by a current collecting member 15. The negative electrode terminal 122 is electrically connected to the negative tab of the electrode assembly 13 by another current collecting member 15.

In some embodiments of this application, the electrode assembly 13 may be of a jelly-roll structure with a winding axis parallel to the X direction.

In other embodiments, the electrode assembly 13 may be of a stacked structure that is stacked along the Y direction.

The insulation assembly 14 is configured to dielectrically protect the electrode assembly 13, so as to dielectrically insulate the electrode assembly 13 from the cover plate 121 and dielectrically insulate the tab 132 from the inner surface of the housing 11.

The insulation assembly 14 includes a first insulation piece 141 and a second insulation piece 142 that are discretely disposed and connected to each other. The first insulation piece 141 is located between the electrode assembly 13 and the cover plate 121 to dielectrically insulate the electrode assembly 13 from the cover plate 121. The second insulation piece 142 is disposed between the main body 131 and the inner surface of the housing 11 to dielectrically insulate the tab 132 from the internal surface of the housing 11.

The first insulation piece 141 and the second insulation piece 142 are discretely disposed and connected to each other. This facilitates assembling, and reduces the thickness of an insulation assembly 14 formed by assembling the first insulation piece 141 and the second insulation piece 142, and therefore, reduces the extent to which the outline dimension of the battery cell 10 is increased after the insulation assembly 14 is fitted to the electrode assembly 13, thereby enabling the battery cell 10 to achieve a relatively high energy density.

In some embodiments of this application, both the first insulation piece 141 and the second insulation piece 142 are plastic parts.

In other embodiments, the first insulation piece 141 and the second insulation piece 142 may be silicone parts instead.

In the foregoing solution, the first insulation piece 141 may be an integrated structure, with two ends along the X direction being connected to one second insulation piece 142 separately. There may be two first insulation pieces 141, and the first insulation pieces 141 are connected to the second insulation pieces 142 in one-to-one correspondence. The first insulation piece 141 may include a partial structure that extends along the X direction, and the second insulation piece 142 may include a partial structure that extends along the X direction. The first insulation piece 141 abuts against the second insulation piece 142 closely through their respective partial structures extending along the X direction. Alternatively, the first insulation piece 141 extends along the X direction, and the second insulation piece 142 extends along the Z direction and abuts against the part that is of the first insulation piece 141 and that extends along the X direction.

Figure 4:
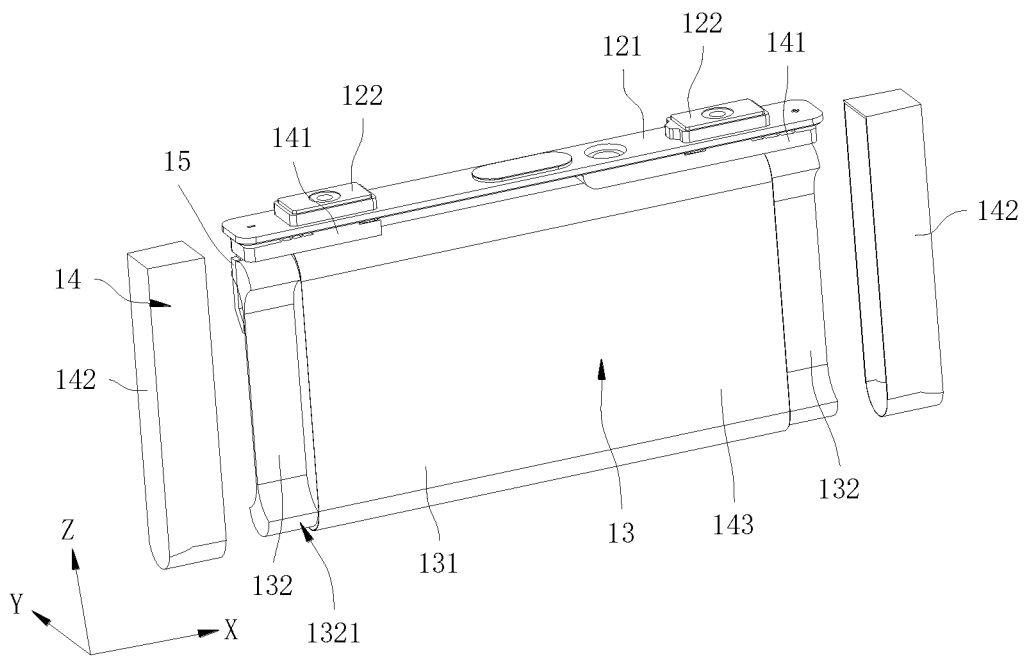
FIG. 4 is an exploded view of a combination of an electrode assembly combined with an insulation assembly according to some embodiments of this application.
Figure 5:
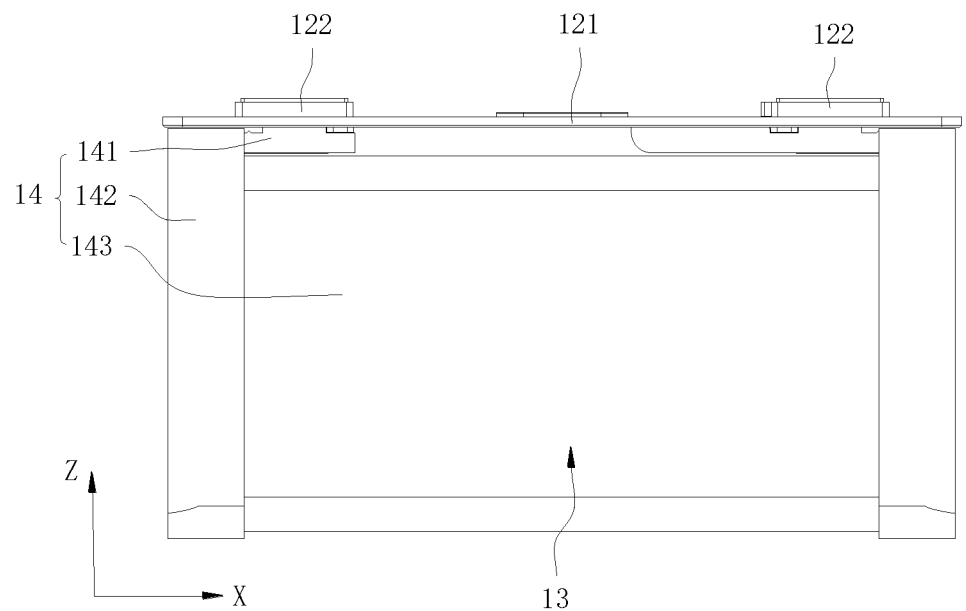
FIG. 5 is a front-view schematic structural diagram of a combination of an electrode assembly combined with an insulation assembly according to some embodiments of this application.

FIG. 4 is an exploded view of an electrode assembly 13 combined with an insulation assembly 14 according to some embodiments of this application; and FIG. 5 is a front-view schematic structural diagram of an electrode assembly 13 combined with an insulation assembly 14 according to some embodiments of this application.

As shown in FIG. 4 and FIG. 5, in some embodiments of this application, two first insulation pieces 141 and two second insulation pieces 142 are disposed. One of the first insulation pieces 141 and one of the second insulation pieces 142 correspond to the positive tab 132 and the positive electrode terminal 122, and the other first insulation piece 141 and the other second insulation piece 142 correspond to the negative tab 132 and the negative electrode terminal 122.

In other embodiments, the first insulation piece 141 may be an integrated structure instead, and two second insulation pieces 142 are disposed. Two ends of the first insulation piece 141 along the X direction are connected to the two second insulation pieces 142 respectively.

The specific structural form of the insulation assembly 14 is described in detail below by using one of the first insulation pieces 141, one of the second insulation pieces 142, and the corresponding tabs 132 and electrode terminals 122 as an example.

Figure 6:
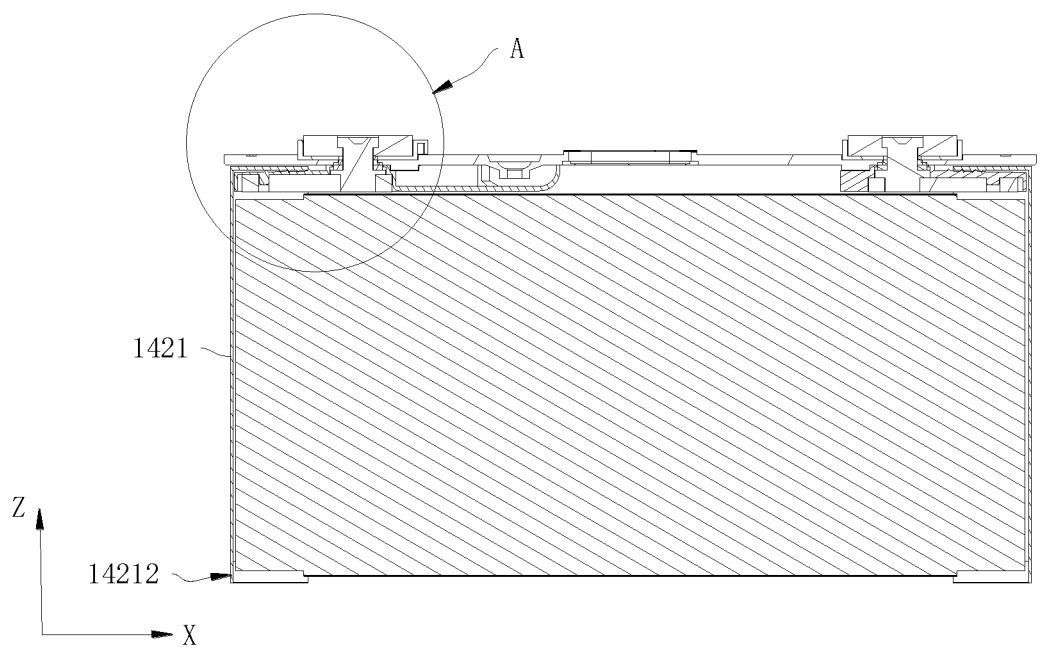
FIG. 6 is a sectional view of a combination of an electrode assembly combined with an insulation assembly according to some embodiments of this application.
Figure 7:
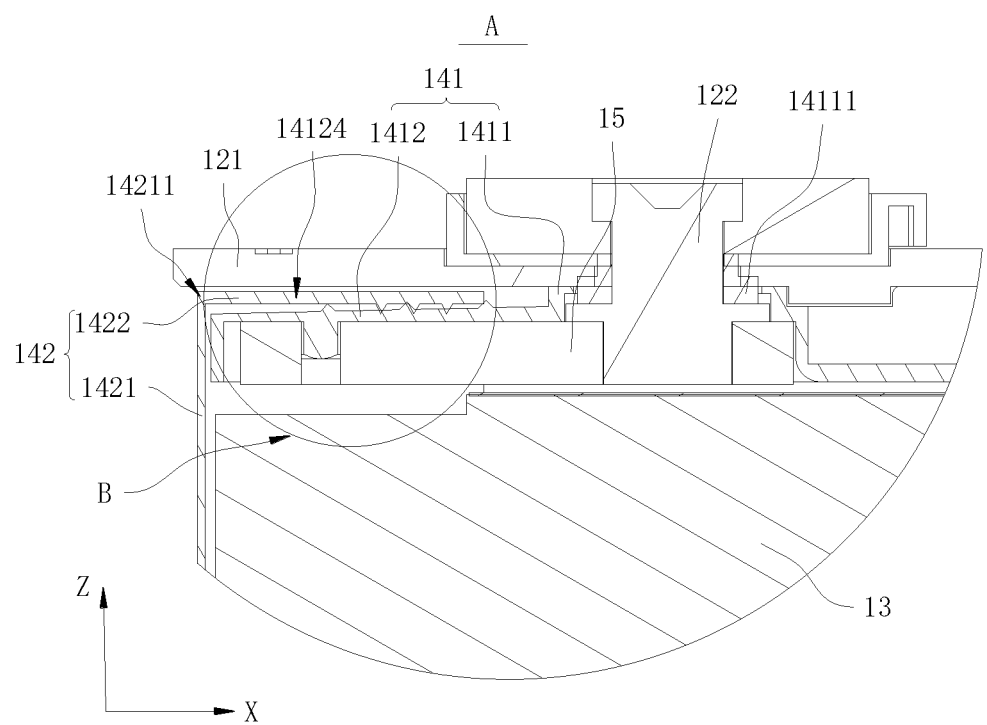
FIG. 7 is a close-up view of a position A shown in FIG. 6.

FIG. 6 is a sectional view of a combination of an electrode assembly 13 combined with an insulation assembly 14 according to some embodiments of this application; and FIG. 7 is a close-up view of a position A shown in FIG. 6.

As shown in FIG. 6 and FIG. 7, in some embodiments of this application, the first insulation piece 141 includes a first part 1411 and a second part 1412. An outer surface of the first part 1411 abuts against the cover plate 121. The second part 1412 is formed by extending the first part 1411 away from the main body 131 along the X direction. An accommodation space 14124 is formed between the second part 1412 and the cover plate 121. The second insulation piece 142 includes a side plate 1421 and a first end plate 1422. The side plate 1421 is located between the tab 132 and the inner surface of the housing 11 along the X direction. The side plate 1421 extends along a direction perpendicular to the X direction (that is, along the YZ plane). Along the Z direction, an end that is of the side plate 1421 and that is oriented toward the cover plate 121 is a first end 14211, and an end oriented away from the cover plate 121 is a second end 14212. One end of the first end plate 1422 is connected to the first end 14211 of the side plate 1421, and the other end of the first end plate 1422 extends into the accommodation space 14124 and abuts against the second part 1412, so as to implement connection between the first insulation piece 141 and the second insulation piece 142.

The side plate 1421 can dielectrically insulate the tab 132 from the inner surface of the housing 11 in the X direction. The first end plate 1422 and the second part 1412 abut each other and jointly dielectrically insulate the tab 132 from the cover plate 121 in the Z direction. The first end plate 1422 extends into the accommodation space 14124 and abuts against the second part 1412, thereby enabling the second part 1412 to fill a clearance between the first end plate 1422 and the tab 132 along the Z direction, and preventing the second insulation piece 142 from wobbling against the tab 132 along the Z direction to get detached from the tab 132.

In other embodiments of this application, the second insulation piece 142 may include a side plate 1421 alone. The first end 14211 of the side plate 1421 is directly connected to the second part 1412 of the first insulation piece 141, so as to simplify the structure of the insulation assembly 14.

In other embodiments of this application, the outer surface of the second part 1412 of the first insulation piece 141 abuts between the cover plate 121 and the tab 132. A groove that extends along the X direction is opened in the second part 1412, and the groove forms an accommodation space 14124. The first end plate 1422 is inserted into the groove to implement connection between the first insulation piece 141 and the second insulation piece 142.

In some embodiments of this application, the first part 1411 of the first insulation piece 141 abuts between the electrode assembly 13 and the cover plate 121 along the Z direction, and is equipped with an insulation bulge 14111 inserted into the electrode lead-out hole. The electrode terminal 122 runs through the insulation bulge 14111, so as to be dielectrically disposed on the cover plate 121. One end of the current collecting member 15 is connected to the electrode terminal 122 at the first part 1411, and the other end is connected to the tab 132. To be specific, the first part 1411 of the first insulation piece 141 serves functions of lower plastic, and is configured to dielectrically insulate the electrode terminal 122 from the cover plate 121, and also configured to dielectrically insulate the electrode assembly 13 from the cover plate 121. The second part 1412 is formed by extending the first part 1411 away from the main body 131 along the X direction, and is configured to be connected to the second insulation piece 142.

In other embodiments, the first part 1411 of the first insulation piece 141 may include no insulation bulge 14111, but may be just a partial structure extending along the X direction, so as to abut between the electrode assembly 13 and the cover plate 121. The first insulation piece 141 is disposed independently from the lower plastic.

Figure 8:
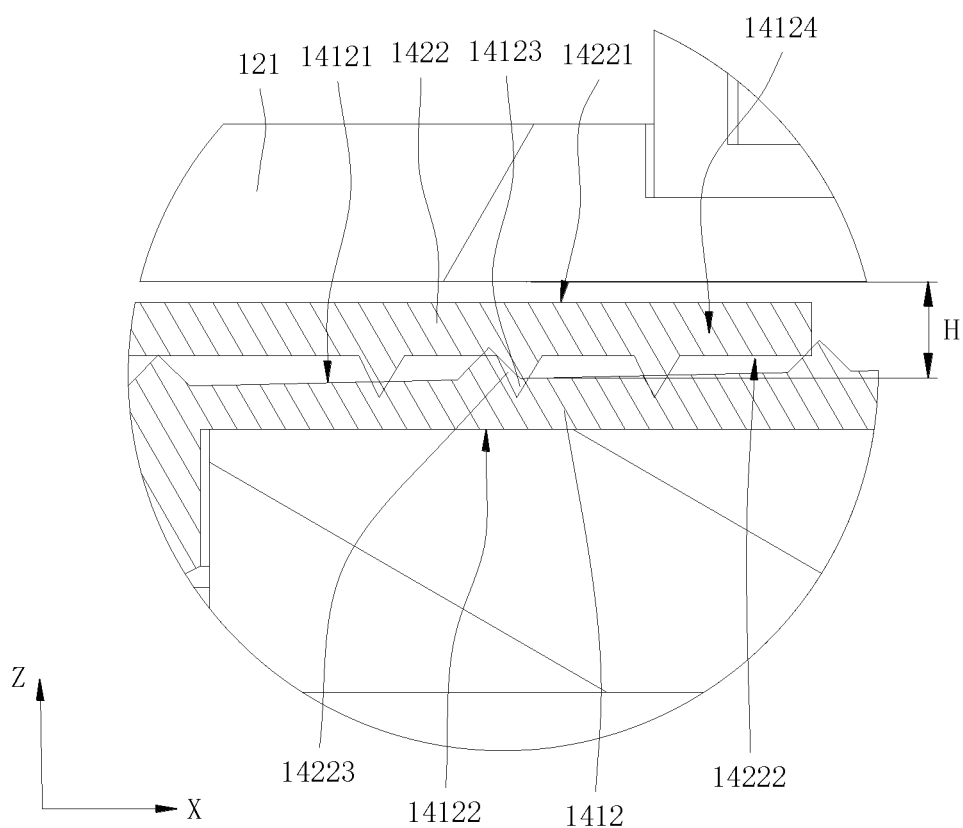
FIG. 8 is a local schematic structural diagram reflecting a connection between a second part and a first end plate.

FIG. 8 is a local schematic structural diagram reflecting a connection between a second part 1412 and a first end plate 1422.

As shown in FIG. 8, along the Z direction, there is an insertion clearance H between the second part 1412 and the cover plate 121. The insertion clearance H is the dimension of the accommodation space 14124 in the Z direction. After the first end plate 1422 is inserted into the accommodation space 14124, the first end plate 1422 adapts to the insertion clearance H in the Z direction, and fits tightly with the second part 1412 to prevent the second insulation piece 142 from wobbling in the Z direction.

According to some embodiments of this application, along a direction consistent with the X direction and oriented away from the main body 131, the insertion clearance H between the second part 1412 and the cover plate 121 increases gradually.

Specifically, two outer surfaces of the second part 1412 along the Z direction are a first surface 14121 and a second surface 14122 respectively. The first surface 14121 is a surface oriented toward the cover plate 121, and the second surface 14122 is a surface oriented away from the cover plate 121. Two surfaces of the first end plate 1422 along the Z direction are a third surface 14221 and a fourth surface 14222 respectively. The third surface 14221 is a surface oriented toward the cover plate 121, and the fourth surface 14222 is a surface oriented away from the cover plate 121. When the first end plate 1422 is inserted into the accommodation space 14124, the first surface 14121 of the second part 1412 abuts against the fourth surface 14222 of the first end plate 1422. Along the direction consistent with the X direction and oriented away from the main body 131, a distance between the first surface 14121 of the second part 1412 and the inner surface of the cover plate 121 is the insertion clearance H. Along the direction consistent with the X direction and oriented away from the main body 131, the first surface 14121 of the second part 1412 tilts away from the cover plate 121, so as to increase the insertion clearance H gradually.

The insertion clearance H that increases gradually along the direction consistent with the X direction and oriented away from the main body 131 makes it easier to insert the first end plate 1422 into the accommodation space 14124 toward the main body 131 along the X direction. Such an insertion clearance simplifies the assembling process of the second insulation piece 142 and the first insulation piece 141, and improves the assembling efficiency.

In some embodiments of this application, the fourth surface 14222 of the first end plate 1422 is snap-fit connected to the first surface 14121 of the second part 1412, so as to restrict the first end plate 1422 from shifting against the first insulation piece 141 along the X direction and implement a firm connection between the second insulation piece 142 and the first insulation piece 141.

In some embodiments of this application, a bulge is disposed on one of, and a groove is disposed on the other of, the first surface 14121 or the fourth surface 14222. The bulge fits with the groove to restrict the first end plate 1422 from shifting against the first insulation piece 141 along the X direction. The structure is simple and easy to process, and the snap-fit connection is firm and reliable.

Figure 9:
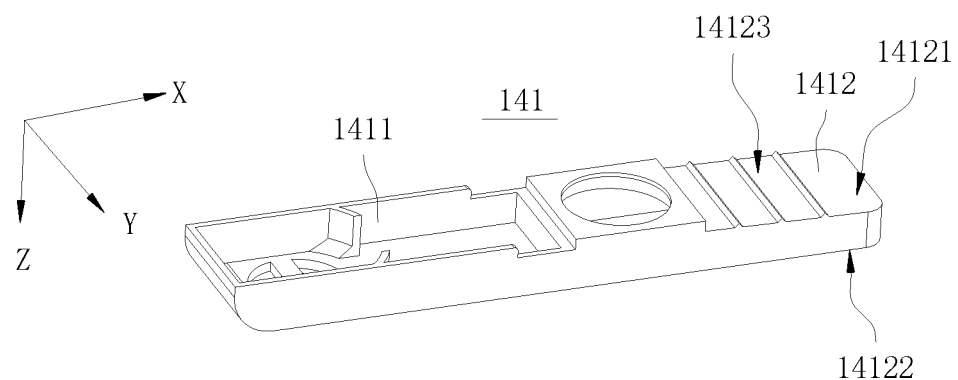
FIG. 9 is a schematic structural diagram of a first insulation piece according to some embodiments of this application.
Figure 10:
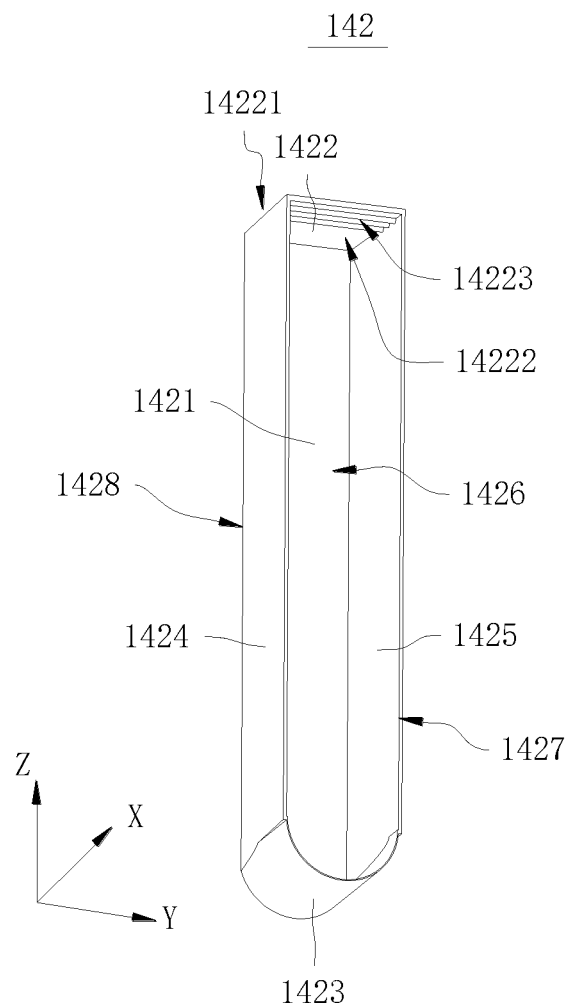
FIG. 10 is a schematic structural diagram of a second insulation piece according to some embodiments of this application.

FIG. 9 is a schematic structural diagram of a first insulation piece according to some embodiments of this application; and FIG. 10 is a schematic structural diagram of a second insulation piece according to some embodiments of this application.

As shown in FIG. 8, FIG. 9, and FIG. 10, in some embodiments of this application, a groove 14123 is disposed on the first surface 14121, and a bulge 14223 is disposed on the fourth surface 14222.

In other embodiments of this application, a bulge is disposed on the first surface 14121, and a groove is disposed on the fourth surface 14222.

In other embodiments of this application, the groove and the bulge are disposed on both the first surface 14121 and the fourth surface 14222, and each groove is snap-fit connected to a corresponding bulge.

In other embodiments, a rough structure may be disposed or an elastic layer may be added on the first surface 14121 and the fourth surface 14222, so that the abutment between first surface 14121 and the fourth surface 14222 restricts the first insulation piece 141 from shifting against the second insulation piece 142 in the X direction.

In the foregoing solution, the second insulation piece 142 may completely wrap the tab 132 in a circumferential direction around an axis extending along the X direction, or may partly wrap the tab 132.

As shown in FIG. 10, in some embodiments of this application, the second insulation piece 142 further includes a second end plate 1423, a third end plate 1424, and a fourth end plate 1425.

The second end plate is connected to the second end 14212 (referring to FIG. 6) of the side plate 1421. The second end plate 1423 is disposed between the tab 132 and the inner surface of the housing 11 along the Z direction to dielectrically insulate the tab 132 from the housing 11 (not shown in the drawing). The third end plate 1424 and the fourth end plate 1425 are connected to the two sides of the side plate 1421 along the Y direction respectively. The side plate 1421, the first end plate 1422, the second end plate 1423, the third end plate 1424, and the fourth end plate 1425 close in to form a cavity 1426 opened toward the electrode assembly 13. The opening of the cavity 1426 is oriented toward the electrode assembly 13 (referring to FIG. 4), and at least a part of the tab 132 is accommodated in the cavity 1426.

Through the foregoing structure, the second insulation piece 142 completely wraps the tab 132 in the circumferential direction around the axis extending along the X direction. At least a part of the tab 132 is located inside the cavity 1426 along the X direction, thereby being able to thoroughly dielectrically insulate the tab 132 from the inner surface of the housing 11, and dielectrically insulate the main body 131 from the cover plate 121.

In other embodiments of this application, the second insulation piece 142 may include just the side plate 1421 and the first end plate 1422. The side plate 1421 dielectrically insulates the tab 132 from the inner surface of the housing 11 along the X direction, and the first end plate 1422 is connected to the first insulation piece 141.

In other embodiments of this application, the second insulation piece 142 may include just the side plate 1421, the first end plate 1422, and the second end plate 1423, thereby further dielectrically protecting the two ends of the tab 132 along the Z direction.

As shown in FIG. 10, in some embodiments of this application, an end that is of the tab 132 and that is oriented away from the cover plate 121 along the Z direction (that is, the end corresponding to the second end plate 1423) includes a curved face 1321 (referring to FIG. 4). The second end plate 1423 is an arc-shaped plate that matches the curved face.

The matching between the second end plate 1423 and the surface of the tab 132 can not only reduce the outline dimension of the second insulation piece 142, but also reduce a clearance between the second insulation piece 142 and the tab 132, and enable a firm fit between the second insulation piece 142 and the tab 132.

In other embodiments, the second end plate 1423 may be of a flat plate structure, so as to simplify the structure of the second insulation piece 142.

As shown in FIG. 10, in some embodiments of this application, one end of the first end plate 1422, the second end plate 1423, the third end plate 1424, and the fourth end plate 1425, separately, oriented away from the side plate 1421 along the X direction, forms a first contour line 1427 of the second insulation piece 142. The contour of the side plate 1421 on the YZ plane is a second contour line 1428 of the second insulation piece 142. On the YZ plane, the second contour line 1428 of the side plate 1421 falls within a projection range of the first contour line 1427. In other words, along a direction consistent with the X direction and oriented toward the main body 131, the second insulation piece 142 is of a flared structure.

The foregoing structural form facilitates a good fit between the second insulation piece 142 and the tab 132.

In other embodiments, on the YZ plane, the first contour line 1427 and the second contour line 1428 may coincide, and the second insulation piece 142 is a cuboidal structure opened at one end, so as to simplify the structure of the second insulation piece 142.

Figure 11:
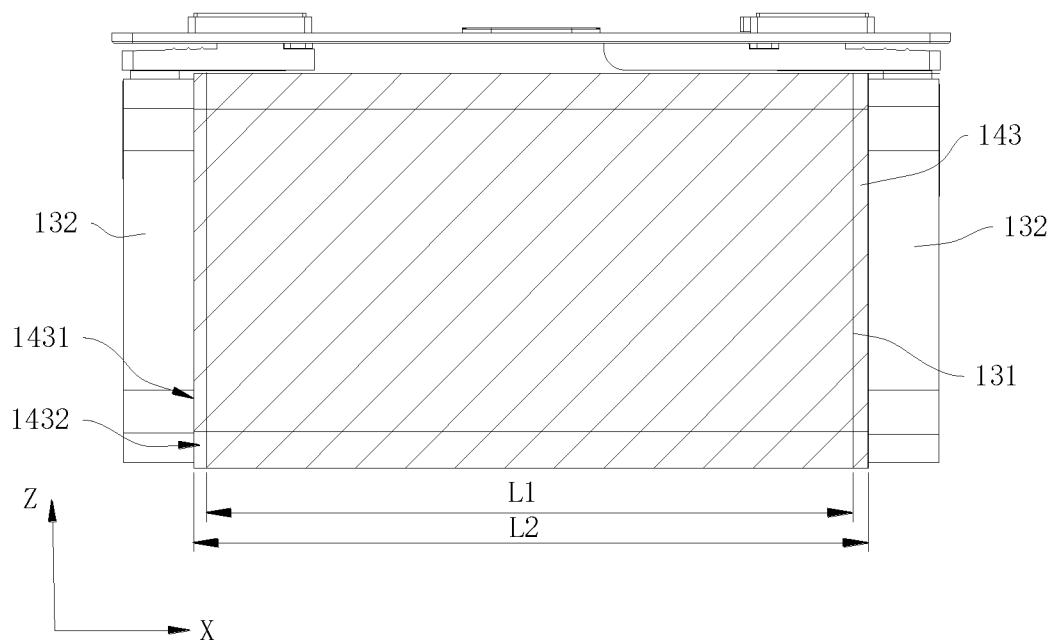
FIG. 11 is a schematic structural diagram of a combination of an electrode assembly combined with an insulation assembly containing a third insulation piece according to some embodiments of this application.

FIG. 11 is a schematic structural diagram of a combination of an electrode assembly combined with an insulation assembly containing a third insulation piece according to some embodiments of this application.

As shown in FIG. 11, in some embodiments of this application, the insulation assembly 14 further includes a third insulation piece 143. The third insulation piece 143 is disposed between the main body 131 and the inner surface of the housing 11 to dielectrically insulate the main body 131 from the housing 11. Both ends of the third insulation piece 143 along the X direction are connection edges 1431. The connection edges 1431 are connected to the second insulation piece 142 in one-to-one correspondence.

Through such an arrangement, the third insulation piece 143 can cover the main body 131 in the circumferential direction around the axis extending along the X direction, so as to dielectrically insulate the main body 131 from the cover plate 121 and dielectrically insulate the main body 131 from the inner surface of the housing 11. The first insulation piece 141 and the third insulation piece 143 have an overlapping connection region 1432 along the X direction. The first insulation piece 141, the second insulation piece 142, and the third insulation piece 143 jointly wrap the electrode assembly 13 to completely dielectrically protect the outer surface of the electrode assembly 13.

In some embodiments of this application, the third insulation piece 143 is an insulation film, and is wrapped around the main body 131 by winding.

In some embodiments, the third insulation piece 143 may be rigid insulation plastic wrapped around the main body 131 by assembling.

In the foregoing solution, on the XZ plane, the second insulation piece 142 may be connected to the third insulation piece 143 in a region of the tab 132, or connected to the tab 132 in a region of the main body 131.

As shown in FIG. 11, in some embodiments of this application, on a plane perpendicular to the Y direction (that is, the XZ plane), a projection of the connection region 1432 between the third insulation piece 143 and the second insulation piece 142 falls into a projection of the tab 132. Along the X direction, the dimension of the main body 131 is L1, the dimension of the third insulation piece 143 is L2, and L2 is greater than L1. Edges at both ends of the third insulation piece 143 exceed edges at both ends of the main body 131.

In other words, the two connection edges 1431 of the third insulation piece 143 fall into the projection of the corresponding tab 132 on the XZ plane separately. With the connection region 1432 falling into the projection of the tab 132 on the XZ plane, the entire main body 131 can be dielectrically protected without additionally increasing the outline dimension of the battery cell 10, and therefore, the battery cell 10 achieves a relatively high energy density.

In other embodiments, the connection edge 1431 falls into the projection of the tab 132 on the XZ plane, and the projection of the connection region 1432 on the YZ plane partly falls into the projection of the main body 131, so as to increase the area of the connection region 1432 between the second insulation piece 142 and the third insulation piece 143 and implement a firm connection.

A process of assembling the battery cell 10 in an embodiment of this application is as follows:

Covering the main body 131 with the third insulation piece 143 along a circumferential direction around the axis extending in the X direction;

Connecting the first part 1411 of the first insulation piece 141 to the cover plate 121, inserting the insulation bulge 14111 into an electrode lead-out hole, leaving the electrode terminal 122 to run through the insulation bulge 14111 along the Z direction, and connecting the two ends of the current collecting member 15 to the electrode terminal 122 and the tab 132 respectively, so that the cover plate 121, the electrode assembly 13, and the first insulation piece 141 form an integrated structure;

Sheathing corresponding tabs 132 into the two second insulation pieces 142 along the X direction toward the main body 131, inserting the first end plate 1422 of each second insulation piece 142 into the accommodation space 14124, and inserting the connection edge 1431 of the third insulation piece 143 into the second insulation piece 142 along the X direction to form a connection region 1432, so as to leave the projection of the connection region 1432 on the XZ plane to fall within the projection of the tab 132 and form a combination of the insulation assembly 14 and the electrode assembly 13; and Putting the electrode assembly 13 combined with the insulation assembly 14 into the housing 11, closing the opening of the housing 11 by use of the cover plate 121, and welding the cover plate 121 onto the opening of the housing 11 to form a battery cell 10.

In the foregoing assembling process, because the first insulation piece 141 and the second insulation piece 142 are discretely disposed and connected to each other, the connection structure that connects the first insulation piece 141 and the second insulation piece 142 does not additionally increase the thickness in the Y direction. The second insulation piece 142 is connected to the third insulation piece 143 in the region of the tab 132, without additionally increasing the thickness in the Y direction. In this way, the insulation assembly 14 implements the function of dielectric protection by increasing just a small amount of thickness oriented outward from the outer surface of the electrode assembly 13. Therefore, the technical solution hereof increases the energy density of the battery cell 10 on the basis of ensuring the safety performance, and improves the efficiency of industrialized assembling.

It is hereby noted that to the extent that no conflict occurs, the features in the embodiments of this application may be combined with each other.

The embodiments described above are merely exemplary embodiments of this application, but are not intended to limit this application. To a person skilled in the art, various modifications and variations may be made to this application. Any modifications, equivalent replacements, improvements, and the like made without departing from the spirit and principles of this application still fall within the protection scope of this application.

What is claimed is:

1. A battery cell, comprising:
   a housing having an opening;
   a cover plate, configured to close the opening;
   an electrode assembly, disposed in the housing, wherein the electrode assembly comprises a main body and a tab extending from an end of the main body along a first direction, the cover plate is located on a side of the main body along a second direction, and the first direction is perpendicular to the second direction;
   a first insulation piece, disposed between the electrode assembly and the cover plate to dielectrically insulate the electrode assembly from the cover plate; and
   a second insulation piece, disposed between the main body and an inner surface of the housing to dielectrically insulate the tab from the housing;
   wherein:
   the second insulation piece and the first insulation piece are discretely disposed and connected to each other;
   the second insulation piece comprises a side plate and a first end plate, the side plate is located between the tab and the inner surface of the housing along the first direction, the side plate extends along a direction perpendicular to the first direction, the first end plate is connected to an end of the side plate facing the cover plate, and the first end plate is connected to the first insulation piece;

the second insulation piece further comprises a second end plate, the second end plate is connected to another end of the side plate along the second direction, and the second end plate is disposed between the tab and the inner surface of the housing along the second direction to dielectrically insulate the tab from the housing; and an end of the tab facing away from the cover plate along the second direction comprises a curved face, and the second end plate is an arc-shaped plate that matches the curved face.

2. The battery cell according to claim 1, wherein the first insulation piece comprises a first part and a second part, an outer surface of the first part abuts against the cover plate, the second part is formed by extending the first part away from the main body along the first direction, an accommodation space is formed between the second part and the cover plate, and the first end plate extends into the accommodation space and abuts against the second part.

3. The battery cell according to claim 2, wherein, along a direction consistent with the first direction and oriented away from the main body, a distance between the second part and the cover plate increases gradually.

4. The battery cell according to claim 2, wherein a surface of the first end plate facing away from the cover plate is snap-fit connected to a surface of the second part close to the cover plate, to restrict the first end plate from shifting against the first insulation piece along the first direction.

5. The battery cell according to claim 4, wherein:

a bulge is disposed on one of the surface of the second part close to the cover plate and the surface of the first end plate and facing away from the cover plate;

a groove is disposed on another one of the surface of the second part close to the cover plate and the surface of the first end plate and facing away from the cover plate; and the bulge fits with the groove to restrict the first end plate from shifting against the first insulation piece along the first direction.

6. The battery cell according to claim 1, wherein:

the second insulation piece further comprises a third end plate and a fourth end plate;

the third end plate and the fourth end plate are connected to two sides of the side plate along a third direction respectively;

the third direction is perpendicular to the first direction and the second direction;

the side plate, the first end plate, the second end plate, the third end plate, and the fourth end plate close in to form a cavity opened toward the electrode assembly; and at least a part of the tab is accommodated in the cavity.

7. The battery cell according to claim 6, further comprising:

a third insulation piece, wherein the third insulation piece is disposed between the main body and the inner surface of the housing to dielectrically insulate the main body from the housing;

wherein:

an end of the third insulation piece along the first direction is connected to the second insulation piece; and on a plane perpendicular to the third direction, a projection of a connection region between the third insulation piece and the second insulation piece falls in a projection of the tab.

8. A battery, comprising:

a battery cell, comprising:

a housing having an opening;

a cover plate, configured to close the opening;

an electrode assembly, disposed in the housing, wherein the electrode assembly comprises a main body and a tab extending from an end of the main body along a first direction, the cover plate is located on a side of the main body along a second direction, and the first direction is perpendicular to the second direction;

a first insulation piece, disposed between the electrode assembly and the cover plate to dielectrically insulate the electrode assembly from the cover plate; and a second insulation piece, disposed between the main body and an inner surface of the housing to dielectrically insulate the tab from the housing;

wherein:

the second insulation piece and the first insulation piece are discretely disposed and connected to each other;

the second insulation piece comprises a side plate and a first end plate, the side plate is located between the tab and the inner surface of the housing along the first direction, the side plate extends along a direction perpendicular to the first direction, the first end plate is connected to an end of the side plate facing the cover plate, and the first end plate is connected to the first insulation piece;

the second insulation piece further comprises a second end plate, the second end plate is connected to another end of the side plate along the second direction, and the second end plate is disposed between the tab and the inner surface of the housing along the second direction to dielectrically insulate the tab from the housing; and an end of the tab facing away from the cover plate along the second direction comprises a curved face, and the second end plate is an arc-shaped plate that matches the curved face.

9. An electrical device, comprising:

a battery, comprising a battery cell comprising:

a housing having an opening;

a cover plate, configured to close the opening;

an electrode assembly, disposed in the housing, wherein the electrode assembly comprises a main body and a tab extending from an end of the main body along a first direction, the cover plate is located on a side of the main body along a second direction, and the first direction is perpendicular to the second direction;

a first insulation piece, disposed between the electrode assembly and the cover plate to dielectrically insulate the electrode assembly from the cover plate; and a second insulation piece, disposed between the main body and an inner surface of the housing to dielectrically insulate the tab from the housing;

wherein:

the second insulation piece and the first insulation piece are discretely disposed and connected to each other;

the second insulation piece comprises a side plate and a first end plate, the side plate is located between the tab and the inner surface of the housing along the first direction, the side plate extends along a direction perpendicular to the first direction, the first end plate is connected to an end of the side plate facing the cover plate, and the first end plate is connected to the first insulation piece;

the second insulation piece further comprises a second end plate, the second end plate is connected to another end of the side plate along the second direction, and the second end plate is disposed between the tab and the inner surface of the housing along the second direction to dielectrically insulate the tab from the housing; and an end of the tab facing away from the cover plate along the second direction comprises a curved face, and the second end plate is an arc-shaped plate that matches the curved face.

* * * * *